United States Patent
Vahdat et al.

(10) Patent No.: US 9,246,770 B1
(45) Date of Patent: Jan. 26, 2016

(54) SYSTEM AND METHOD FOR DETERMINING A PRIMARY CONTROLLER IN SOFTWARE DEFINED NETWORKING

(71) Applicant: Google Inc., Mountain View, CA (US)

(72) Inventors: Amin Vahdat, Los Altos, CA (US); Leon Poutievski, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 14/143,384

(22) Filed: Dec. 30, 2013

(51) Int. Cl.
  *H04L 12/28* (2006.01)
  *H04L 12/24* (2006.01)
(52) U.S. Cl.
  CPC ...................... *H04L 41/20* (2013.01)
(58) Field of Classification Search
  CPC ............ G06F 3/0689; G06F 17/30581; G06F 15/173; G06F 15/16; H04L 47/10; H04L 45/54; H04L 43/067
  See application file for complete search history.

(56) References Cited

U.S. PATENT DOCUMENTS

| | | | |
|---|---|---|---|
| 6,449,615 B1 * | 9/2002 | Liu | G06F 17/3089 |
| 2001/0032263 A1 * | 10/2001 | Gopal | G06Q 30/06 709/227 |
| 2008/0162663 A1 * | 7/2008 | Schlansker | G06F 13/385 709/217 |
| 2013/0028091 A1 | 1/2013 | Sun et al. | |
| 2013/0194914 A1 | 8/2013 | Agarwal et al. | |

OTHER PUBLICATIONS

"Open Flow Switch Specification", Version 1.1.0 Implemented, (Wire Protocol 0x02), (2011), pp. 1-56.
Burrows, M., The Chubby lock service for loosely-coupled distributed systems, Google Inc., Nov. 2006, pp. 1-16.
Chandra et al., "Paxos Made Live—An Engineering Perspective", (2007), pp. 1-16.
McKeown et al., "OpenFlow: Enabling Innovation in Campus Networks", (2008), pp. 1-6.
Vanbever et al., HotSwap: Correct and Efficient Controller upgrades for Softwar-Defined, Networks, Aug. 2013, pp. 1-6.
Yazici et al., "Controlling a Software-Defined Network via Distributed Controllers", pp. 1-23, 2012 NEM Summit, Oct. 16-18, 2012, Istanbul, Turkey.

* cited by examiner

*Primary Examiner* — Kim T Nguyen
(74) *Attorney, Agent, or Firm* — Edward A. Gordon; Foley & Lardner LLP

(57) ABSTRACT

Aspects of the disclosure relate generally to selecting and identifying a primary controller server among a group of servers on a network. In order to do so, a first computer may set a first number to zero when a storage system associated with the first computer is initialized. The first computer may conduct an election protocol to select a primary controller computer from a plurality of computers. After selecting the primary computer, increase the first number by a given value and send it to the selected primary computer. The selected primary computer may set a second number corresponding to an absolute time when the storage system associated with the first computer is initialized. The selected primary computer may receive the first number from the first computer. The selected primary computer may send the numbers to a client device. After sending, the primary computer may establish a connection with the client.

19 Claims, 11 Drawing Sheets

1000

SYSTEM AND METHOD FOR DETERMINING A PRIMARY CONTROLLER IN SOFTWARE DEFINED NETWORKING

BACKGROUND

In Software Defined Networking, system administrators can use controllers to remotely control devices on a network such as servers and switches. If one of a plurality of servers is updated, then it may be necessary for all client devices to communicate with the most up-to-date server. In this regard, an election protocol may be implemented to select a primary controller server among a group of servers. The client devices may then be able to communicate with the selected primary controller server, the selected primary controller server being the most up-to-date server. Sometimes, however, it may be difficult for client devices to identify the primary controller server among a group of servers.

SUMMARY

Aspects of the disclosure provide a computer implemented system and method. The method includes initializing a database associated with a computer storage system server; selecting, using one or more processors, a primary controller computer from a plurality of server computers, each of the plurality of server computers having a controller sequence number and a timing sequence number associated therewith, the controller sequence number indicative of which server computer from the plurality of server computers is to be used as the primary controller computer, and the timing sequence number indicative of which server computers from the plurality of server computers received notification of the database's initialization; when the primary controller computer is selected, increasing, using the one or more processors, the controller sequence number by a given value; and sending, using the one or more processors, the increased controller sequence number to the selected primary controller computer and not to other ones of the plurality of server computers.

In one example, the selected primary controller computer is a first primary controller computer, and the method includes selecting a new primary controller computer from the plurality of computers; increasing the controller sequence number by the given value; and sending the increased controller sequence number to the new primary controller computer and not to the first primary controller computer or other ones of the plurality of server computers. In another example, upon initialization of the computer storage system server, setting the timing sequence number to correspond to a second given value after receiving notification that the database associated with the computer storage system server has initialized; and the selected primary controller computer sending the controller sequence number to a plurality of client devices. In this regard, the second given value corresponds to one of either an absolute time or a number. As another example, upon initialization of the computer storage system server, a second storage system server setting the timing sequence number to correspond to a second given value; and the second storage system server sending the timing sequence number to at least one of the plurality of computers.

Another aspect of the disclosure discloses another computer implemented method. By way of example, the method includes receiving a timing sequence number and a controller sequence number from each of a plurality of server computers, the timing sequence number indicative of which server computers from the plurality of server computers received notification of initialization of a computer storage system server, and the controller sequence number indicative of which server computer from the plurality of server computers is to be used as a primary controller computer; determining, using one or more processors, which server computer is the primary controller computer by evaluating values of both the timing sequence number and the controller sequence number; and based on the determination of the primary controller computer, establishing, using the one or more processors, a connection between a client device and the primary controller computer.

As another example, the method of determining which server computer is the primary controller computer includes identifying at least one server computer from the plurality of server computers with a highest value of the timing sequence number; and selecting the primary controller computer based on the server computer with the highest value of the controller sequence number from among the identified server computers. In another example, the method includes storing a highest tuple of the timing sequence number and the controller sequence number from among all tuples of the timing sequence number and the controller sequence number for each of a plurality of server computers; and rejecting any received sequence numbers that are a lower tuple than the stored highest tuple of the timing sequence number and the controller sequence number. In another example, the method includes communicating with an alternative controller computer from the plurality of server computers until the connection with the primary controller computer is established.

Another aspect of the disclosure provides a system comprising one or more computing devices. The system includes a computer storage system server; and a plurality of server computers, the plurality of server computers including a primary controller computer, each of the plurality of server computers being operatively coupled to the computer storage system server; and the computer storage system server may initialize a database associated with the computer storage system server; select the primary controller computer from the plurality of server computers, each of the plurality of server computers having a controller sequence number and a timing sequence number associated therewith, the controller sequence number indicative of which server computer from the plurality of server computers is to be used as the primary controller computer, and the timing sequence number indicative of which server computers from the plurality of server computers received notification of the database's initialization; when the primary controller computer is selected, increase the controller sequence number by a given value; and send the increased controller sequence number to the selected primary controller computer and not to other ones of the plurality of server computers.

As another example, the selected primary controller computer is a first primary controller computer, and the one or more processors of the computer storage system server may select a new primary controller computer from the plurality of computers; increase the controller sequence number by the given value; and send the increased controller sequence number to the new primary controller computer and not to the first primary controller computer or other ones of the plurality of server computers. As another example, the system may set the timing sequence number to correspond to a second given value after receiving notification that the database associated with the computer storage system server has initialized; only the primary controller computer from among the plurality of server computers receives the controller sequence number from the computer storage system server; and only the primary controller computer sends the controller sequence number to a plurality of client devices. In another example, the system may include a second computer storage system server with one or more processors configured to set the timing sequence number to correspond to a second given value when the second computer storage system server receives notification that the database associated with the computer storage system server has initialized; and send the timing sequence number to at least one of the plurality of computers.

Another aspect of the disclosure provides another system comprising one or more computing devices. For example, a client device comprising one or more processors configured to receive a timing sequence number and a controller sequence number from each of a plurality of server computers in a computer network, the timing sequence number indicative of which server computers from the plurality of server computers received notification of initialization of a computer storage system server, and the controller sequence number indicative of which server computer from the plurality of server computers is to be used as a primary controller computer; determine which server computer of the plurality is the primary controller computer by evaluating values of both the timing sequence number and the controller sequence number; and based on the determination of the primary controller computer, establish a connection between the client device and the primary controller computer.

In another example, the client may determine which server computer is the primary controller computer by identifying at least one server computer from the plurality of server computers with a highest timing sequence number; and selecting the primary controller computer based on the server computer with a highest controller sequence number from among the identified server computers. In another example, the client device may store a highest tuple of the timing sequence number and the controller sequence number from among all tuples of the timing sequence number and the controller sequence number for each of a plurality of server computers; and reject any received sequence numbers that are a lower tuple than the stored highest tuple of the timing sequence number and the controller sequence number. As another example, the client device may communicate with an alternative controller computer from the plurality of server computers until the connection with the primary controller computer is established.

Another aspect of the disclosure discloses a non-transitory computer-readable storage medium on which computer readable instructions of a program are stored, the instructions, when executed by one or more processors, cause the one or more processors to perform a method. For example, the method may include receiving a timing sequence number and a controller sequence number from each of a plurality of server computers, the timing sequence number indicative of which server computers from the plurality of server computers received notification of initialization of a computer storage system server, and the controller sequence number indicative of which server computer from the plurality of server computers is to be used as a primary controller computer; determining, using one or more processors, which server computer is the primary controller computer by evaluating values of both the timing sequence number and the controller sequence number; and based on the determination of the primary controller computer, establishing, using the one or more processors, a connection between a client device and the primary controller computer.

As another example, the method may include identifying at least one server computer from the plurality of server computers with a highest value of the timing sequence number; and selecting the primary controller computer based on the server computer with the highest value of the controller sequence number from among the identified server computers.

DETAILED DESCRIPTION

Figure 1:
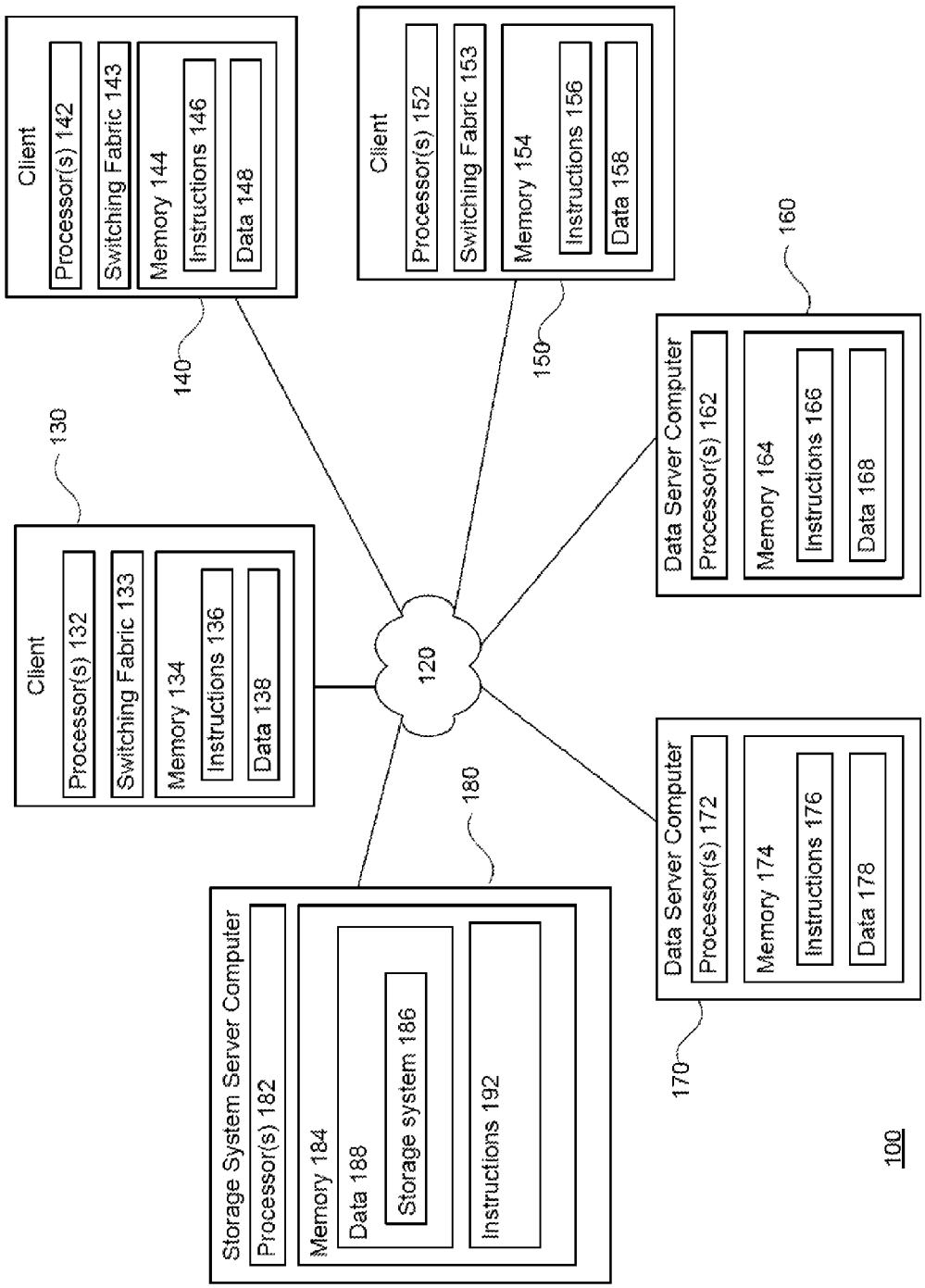
FIG. 1 is a functional diagram of an example system in accordance with aspects of the disclosure.

Aspects of the technology discussed herein pertain to distributed systems and a method for client devices to reliably communicate with primary controller servers on a network. For example, aspects of the disclosure may be used on the back-end of a company's infrastructure to process data. This back-end infrastructure may include storage, multiple servers connected to the storage, and multiple client devices that may communicate with the servers. An election protocol may be implemented in order to select a primary controller server. Each server may store two sequence numbers that may serve as indicators identifying which server is currently the primary controller server. In one instance, the servers may send their sequence numbers to at least one of the client devices. Each client device may process the sequence numbers it received from each server and determine which server is the primary controller server. After determining which server is the primary controller server, each client device may reliably connect with, send data to, and receive data from the correct and most up-to-date primary controller server.

In order for the client devices to determine the primary controller server, two sequence numbers may be employed. A first sequence number may increase monotonically only when a storage system server is initialized. In addition, the first sequence number may be stored locally on each server or remotely in a second storage system. When the first sequence number is stored locally, the first sequence number may be updated by the absolute time. For example, when the storage system server initializes the first sequence number may be set to the current date and time at initialization. Using the absolute time to update the first sequence number may ensure that the first sequence number is always increasing. Alternatively, when the first sequence number is stored remotely in a second storage system, the first sequence number may be increased by a given value when the storage system server is initialized. The first sequence number may then be sent to each server on the network.

The second sequence number may be stored and processed by a computer associated with the storage system server. When the storage system server initializes, as described above, the second sequence number on the storage system server may be reset to zero. In addition, the second sequence number may increase by a given value when the storage system server selects a particular server as the primary controller server.

The selection of a primary controller server may be performed by way of an election protocol. For example, once an administrator has made a change to the system, an election protocol process, such as Paxos, may be used to select a new primary controller server. The particular election protocol may be selected by the network administrator as part of the system architecture.

After the primary controller server is selected and the second sequence number increases, the second sequence number may be sent from the storage system server to the selected primary controller server. Only the server selected as the primary controller server may receive the second sequence number from the storage system server.

In order for the client devices to know which server is the primary controller server, each server may send their first and second sequence numbers to at least one of the client devices. The client devices may then process the sequence numbers to determine the primary controller server. As one example of the process, a client device may first select at least one server that has the highest first sequence number. More than one server may be selected if multiple servers have the same number. From the group of servers selected, the client device may then select the server with the highest second sequence number as the primary controller server. Once the client device determines the identification of the primary controller server from the group of servers, the client device may reliably communicate with the correct and most up-to-date server.

FIG. 1 includes an example system 100 in which the features described above may be implemented. It should not be considered as limiting the scope of the disclosure or usefulness of the features described herein. System 100 includes a plurality of computing devices such as client devices 130, 140, 150 and servers 160, 170, 180. As shown, server 160 includes one or more processors 162 and memory 164 including instructions 166 and data 168.

The processors receive input and provide output as necessary. As an example, the processors 162 of server 160 may be responsible for handling basic system instructions 166 including running applications, handling calculations and computations, and processing inputs from devices such as a keyboard, mouse, microphone, etc. The processors handle the data received from client devices 130, 140, 150.

Memory 164 may store information that is accessible by the processors 162, including the instructions 166 that may be executed by processor 162 and the data 168. The memory 164 may be of any type of memory operative to store information accessible by the processors 162 including a non-transitory computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The systems and methods herein may include different combinations of the foregoing, whereby different portions of the instructions and data are stored on different types of media.

The instructions 166 may be any set of instructions to be executed directly (such as machine code) or indirectly (such as scripts) by the processors 162. For example, the instructions 166 may be stored as computer code on the computer-readable medium. The instructions 166 may be stored in object code format for direct processing by the processors 162 or in any other computer language including scripts or collections of independent source code modules that are interpreted on demand or compiled in advance.

The data 168 may be retrieved, stored or modified by the processors 162 in accordance with the instructions 166. For instance, although the system and method is not limited by any particular data structure, the data 168 may be stored in computer registers, in a relational database as a table having a plurality of different fields and records, extensible markup language ("XML") documents or flat files. The data may also be formatted in any computer-readable format.

As shown, server 170 may contain one or more processors 172, memory 174, data 176, and instructions 178, which may function similarly as described above with regard to processors 162, memory 164, data 166, and instructions 168 of server 160.

Similarly, server 180 contains one or more processors 182, memory 184, data 188, and instructions 192, which may function similarly as described above with regard to the processors 162, memory 164, data 166, and instructions 168 of server 160. In addition, the memory 186 of server 180 may also store instructions for selecting a primary controller server as well as one or more sequence numbers as will be discussed in detail below.

In addition, data 188 of server 180 may include a storage system 186 that is incorporated into, directly connected to, or located remotely from server 180. In this regard, server 180 may be considered a storage system server. Storage system 186 can be of any type of computerized storage capable of storing information accessible by one or more of client devices such as a hard-drive, memory card, ROM, RAM, DVD, CD-ROM, write-capable, and read-only memories. In addition, storage system 186 may include a distributed storage system where data is stored on a plurality of different storage devices that may be physically located at the same or different geographic locations.

The client devices 130, 140, 150 can be switching devices, e.g., switches, hubs, or other computing devices that can send and receive data. Each of the client device 130, 140, 150 can contain one or more processors 132, memory 134 and other components typically present in switching devices. Memory 134 of the client devices can store information accessible by the one or more processors 132, including instructions 136 that can be executed by the one or more processors 132. The switching device may include switching fabric 133 for forwarding the data frames (or packets) that the switch receives. The method in which the switching fabric 133 forwards these frames may be controlled by the processor(s) 132. The switching device may also include ports (not shown) for ingress and egress of frames.

Although FIG. 1 functionally illustrates the processors, memory, and other elements of computing device 160 as being within the same block, the processors, computer, computing device, or memory can actually comprise multiple processors, computers, computing devices, or memories that may or may not be stored within the same physical housing. For example, the memory can be a hard drive or other storage media located in a housing different from that of computing devices 160. Accordingly, references to a processor, computer, computing device, or memory will be understood to include references to a collection of processors, computers, computing devices, or memories that may or may not operate in parallel. For example, the data server computer 160 may include server computing devices operating as a load-balanced server farm. And although some functions described below are indicated as taking place on a single computing device having a single processor, various aspects of the subject matter described herein can be implemented by a plurality of computing devices, for example, communicating information over network 120.

In this regard, the servers 160, 170, 180 and client devices 130, 140, and 150 can be at various nodes of a network 120 and capable of directly and indirectly communicating with other nodes of network 120. Although only a few computing devices are depicted in FIG. 1, it should be appreciated that a typical system can include a large number of connected computing devices, with each different computing device being at a different node of the network 120. The network 120 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Figure 2:
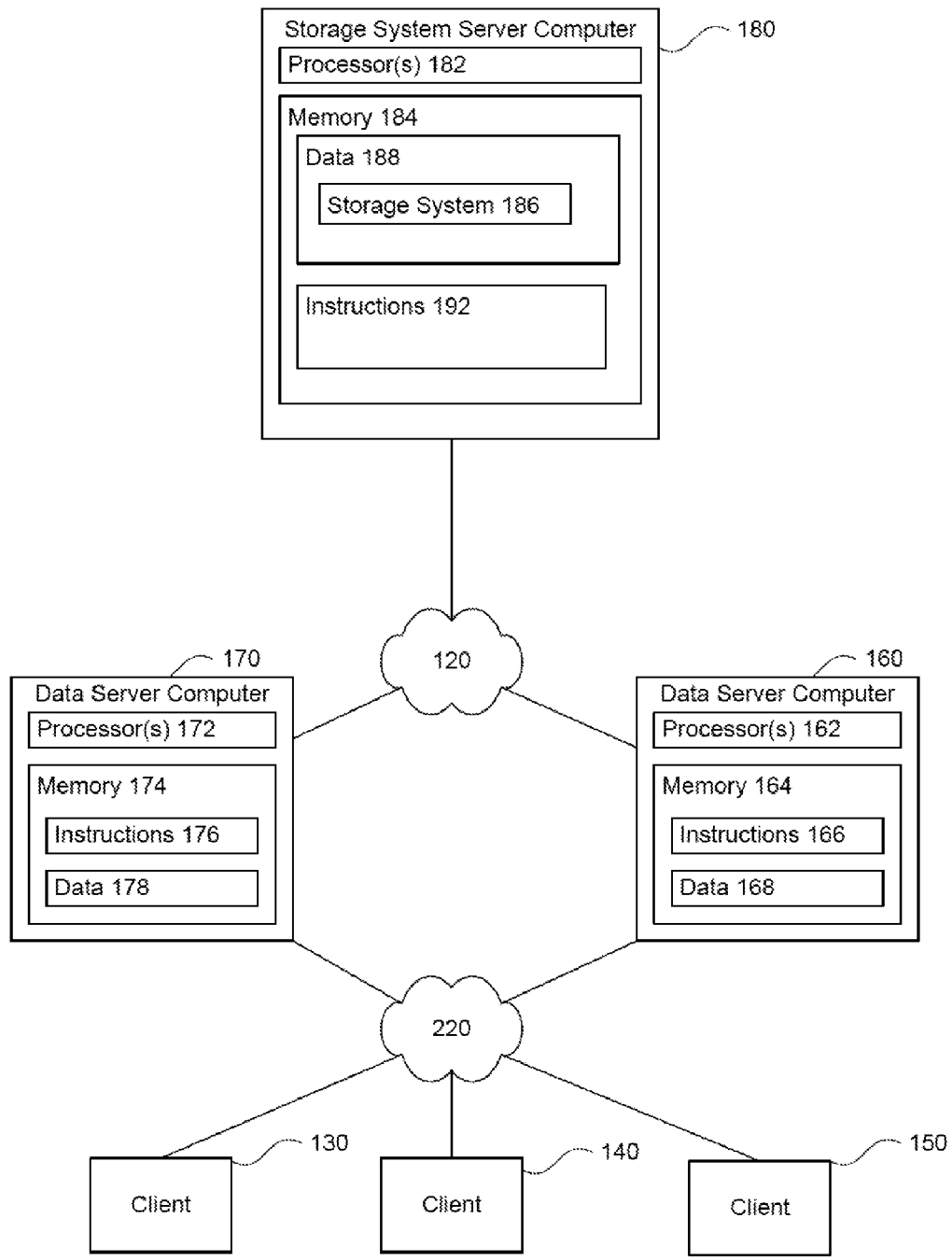
FIG. 2 is a pictorial diagram of the example FIG. 1.

As one example, client devices may only communicate with certain devices on the network as opposed to all devices. FIG. 2 is an example 200 of client devices 130, 140, 150 only communicating with servers 160 and 170. In this regard, client devices 130, 140, 150 may not have direct access to the storage system server 180 or storage system 186. As a result, the client devices 130, 140, 150 may need to communicate with servers 160, 170 as a medium or intermediary in order to access storage system 186 by way of storage system server 180. In this regard, servers 160 and 170 may be considered data servers.

In order to determine a primary controller server, a plurality of sequence numbers may be used. As an example, a first sequence number may be stored locally on data servers 160 and 170 and may correspond to an absolute time when a storage system server is initialized, as described in more detail below.

Figure 3:
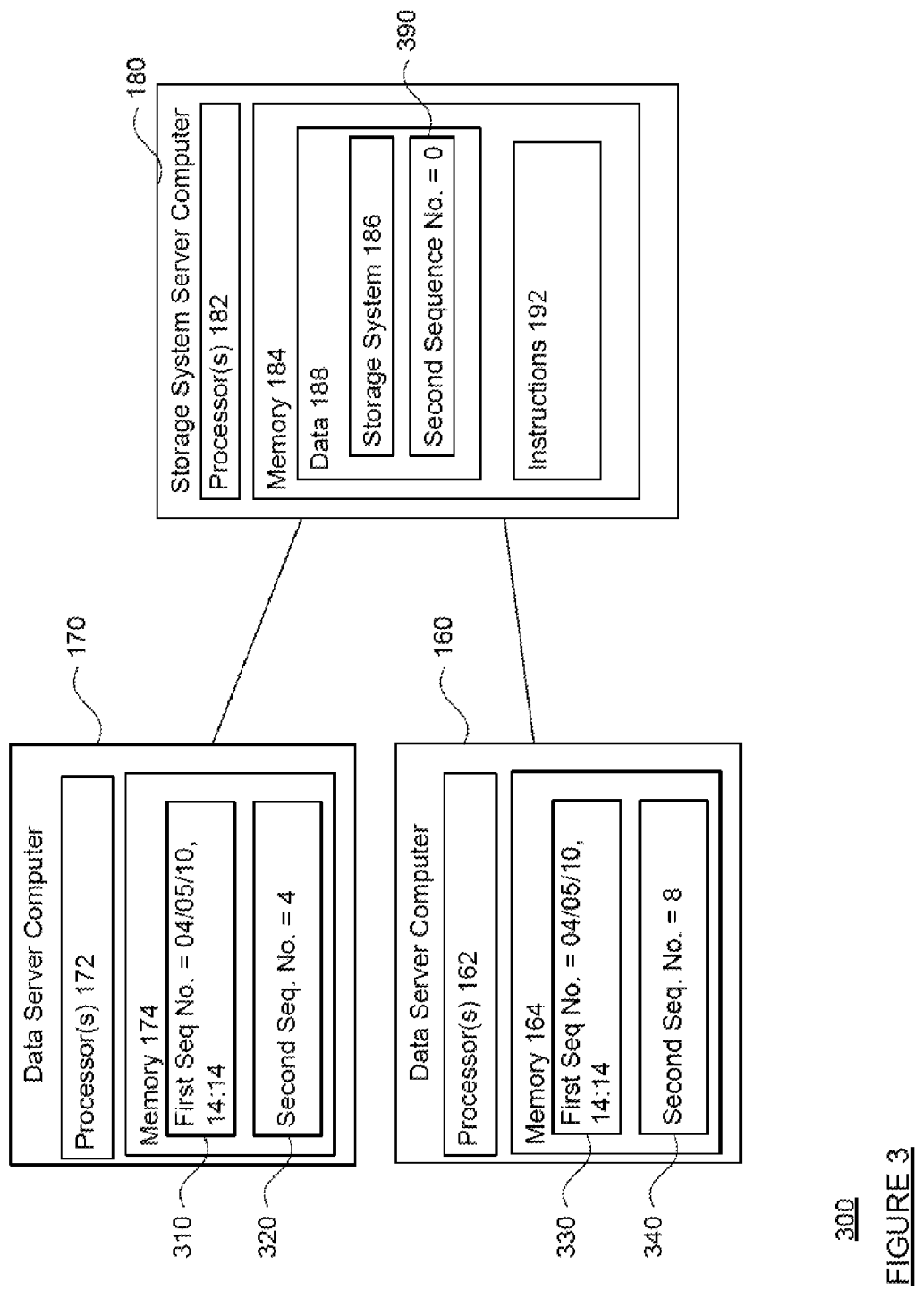
FIG. 3 is an example diagram of aspects of a system before initialization in accordance with aspects of the disclosure.

FIG. 3 is an example 300 of first sequence numbers 310 and 330 corresponding to an absolute time. As shown in FIG. 3, the absolute time may include the month, day, year and time in hours, minutes, and seconds. As another example, the first sequence number may be a series of digits or values that can be increased monotonically.

Figure 4:
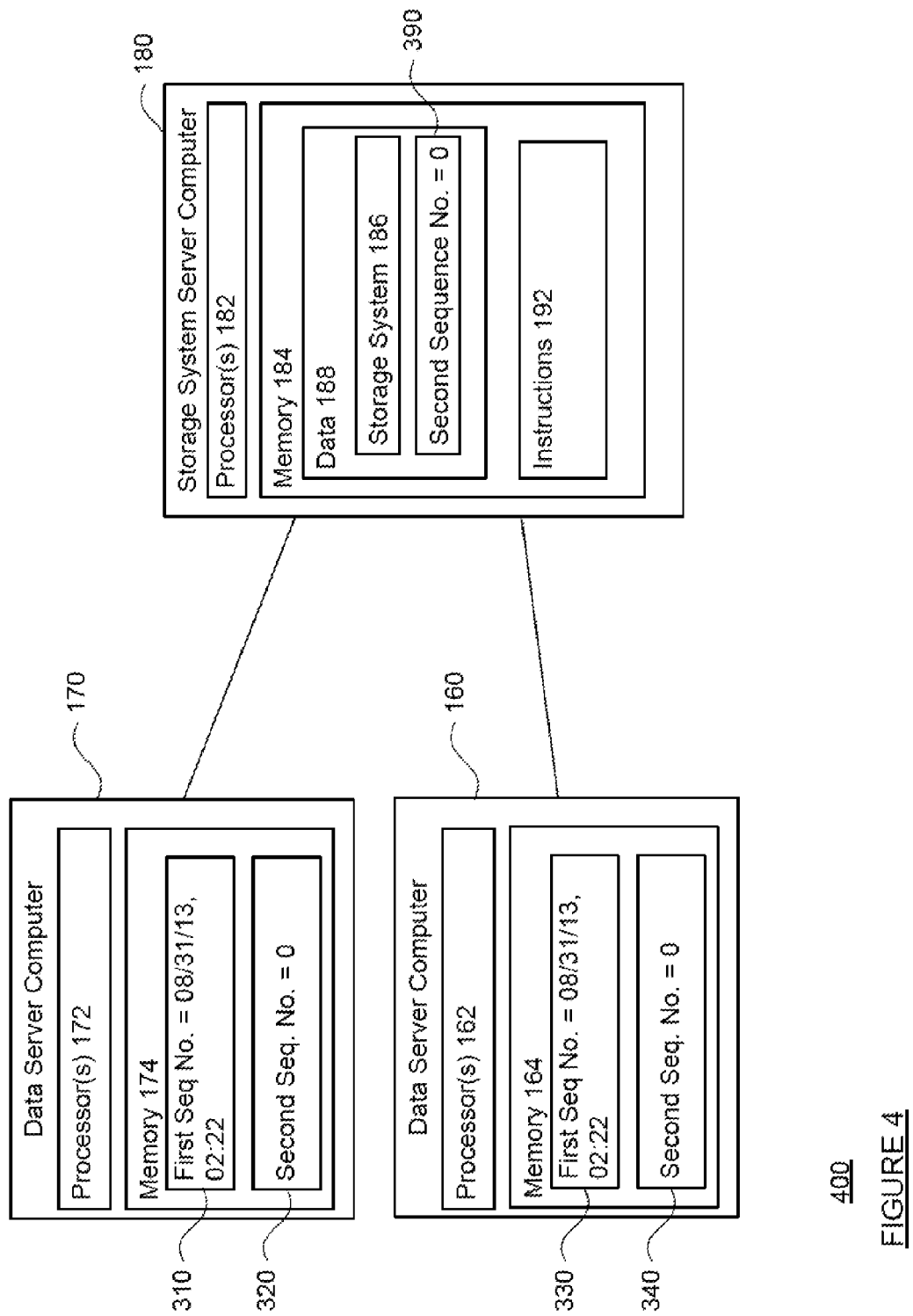
FIG. 4 is an example diagram of the system of FIG. 3 after initialization in accordance with aspects of the disclosure.

When the storage system server is initialized, the first sequence number may be increased according to the absolute time. For example, the processors 162 and 172 of data servers 160 and 170 may update the first sequence numbers 310 and 330. By updating the first sequence number according to the absolute time, this may ensure that the first sequence number is always increasing. FIG. 4 is an example 400 of the first sequence numbers 310 and 330 being updated by data servers 160, 170 to the absolute time when the storage system 186 is initialized. The update of the first sequence numbers may be seen by comparing 310 and 330 of FIGS. 3 and 4.

In one example, in order for the data servers to store the updated first sequence numbers, a majority of the data servers may agree on the value of the first sequence number. For example, when the first sequence number associated with data servers 160 and 170 is updated, data servers 160 and 170 may compare the updated first sequence numbers to verify the numbers are the same. Example 400 of FIG. 4 illustrates the same first sequence number for data servers 160 and 170, the first sequence number being set to the absolute time of 08/31/13, 02:22.

Before, after or in conjunction with the first sequence number updating, a second sequence number may be reset when the storage system server is initialized. For example, the second sequence number may be reset to zero. This second sequence number may be stored locally at each of the data servers of system 100. In this regard, each of data servers 160 and 170 may reset respective second sequence numbers 320, 340 to zero after receiving information from storage system server 180 indicating that storage system 186 has been initialized. For example, as shown in FIG. 4 the second sequence numbers 320, 340 are set to zero by each of the data servers 160, 170 upon receiving information indicating the initialization of the storage system 186. As shown in FIG. 3, prior to initialization the second sequence numbers were values different from zero.

After the first sequence number is updated and the second sequence number is reset at each of the servers, an election protocol may be implemented by storage system server 180. This election protocol may be stored in instructions 192 of memory 184. The election protocol is used by the storage system server 180 to select a primary controller server from the plurality of data servers, here 160 and 170, on a network. The election protocol is used to identify a most up-to-date data server and ensure that that data server is responsible for communicating with the client devices.

For instance, the most up-to-date data server may be the data server that received an update to the data server's database or instructions. For example, an update may include an update to the data server's flow table or routing table. As another example, an update may include optimizations of the data server or other types of configurations, or any other aspect of the data server. In this regard, if one data server receives an update that others do not, then it may be desirable for client devices to communicate with the updated data server as opposed to any other non-updated data servers.

As an example of an election protocol, the Paxos algorithm may be implemented to select a primary controller server. Paxos requires the use of proposers to send a prepare request with a proposal number to acceptors. There may be multiple proposers on a network. The acceptors may accept a proposal number when the proposal number is greater than any other proposal number the acceptor has received. When the proposer receives an acceptance from a majority of acceptors, the proposer may send an accept request to each of the acceptors. From here, the acceptors may accept the accept request as long as the acceptors have not received a higher proposal number. Alternatively, the system administrator may select an election protocol based on the particular infrastructure of the system.

Using the election protocol, a primary controller server is selected from among the plurality of servers. For example, as shown in example 500 of FIG. 5, using the election protocol the one or more processors 182 of storage system server 180 select data server 170 as the primary controller server. Primary controller server 170 may have been selected from among a plurality of servers, here represented by servers 160 and 170.

In some aspects, there may only be a single data server that can be selected as a primary controller server at any given time. In this regard, returning to example 500 of FIG. 5, data server 160 may not be a selected primary controller server since data server 170 has been selected. However, in the event of a change to system 100, such that a new primary controller server is selected from among the data servers, data server 160 may be selected as the primary controller server.

Figure 5:
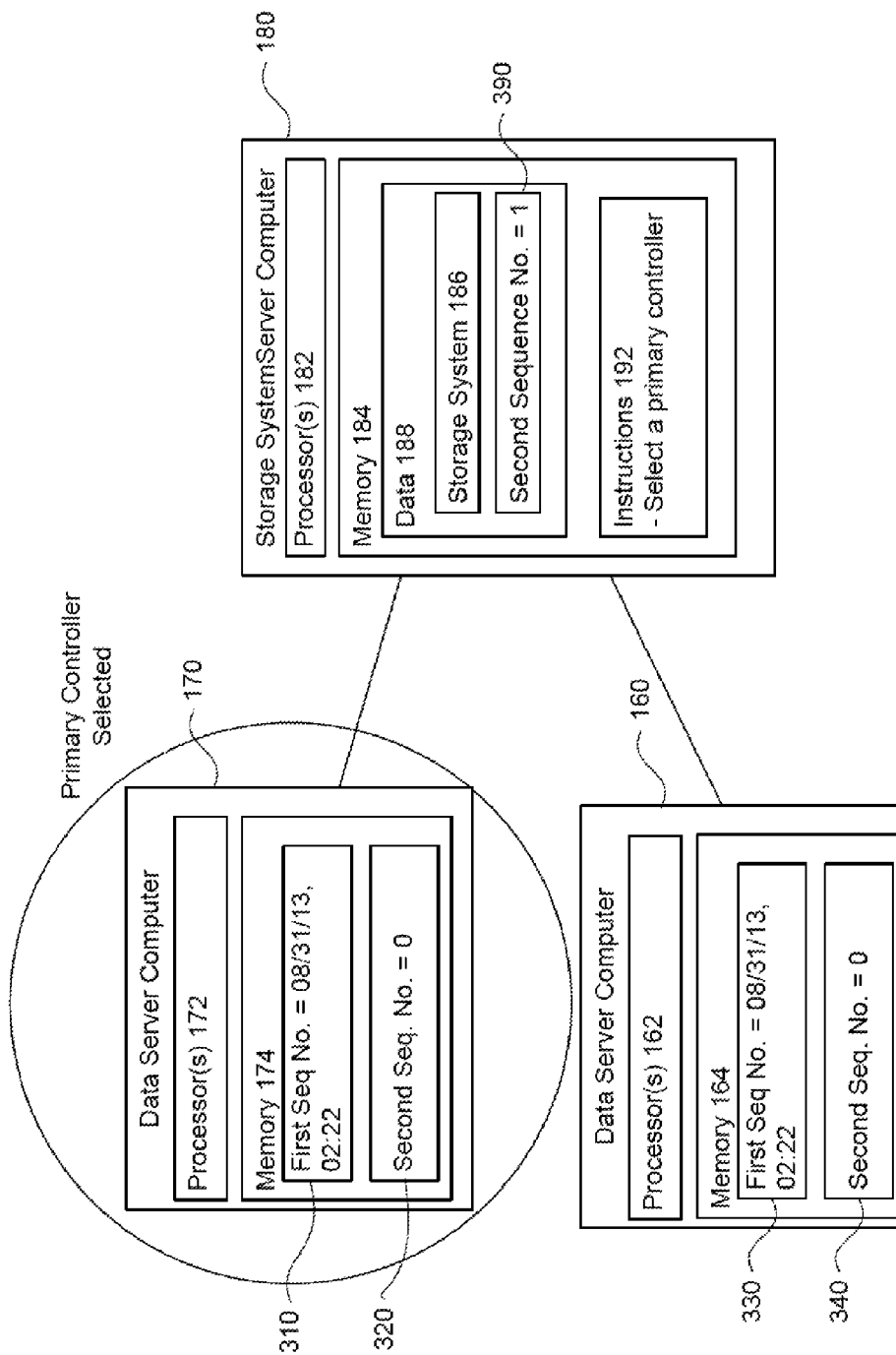
FIG. 5 is an example of selecting a primary controller server in accordance with aspects of the disclosure.

Once a primary controller server has been selected, the second sequence number may be increased. For example, the second sequence number may be increased by a given value, such as an integer. In example 500, second sequence number 390 stored in memory 184 of storage system server 180 is increased from zero (as shown in FIG. 4) to one (as shown in FIG. 5).

In this scenario, after the second sequence number is increased, the storage system server sends the increased second sequence number to the primary controller server. For example, using processor 182 on storage system server 180, the second sequence number is retrieved from memory 184 and sent to the selected primary controller server 170.

Figure 6:
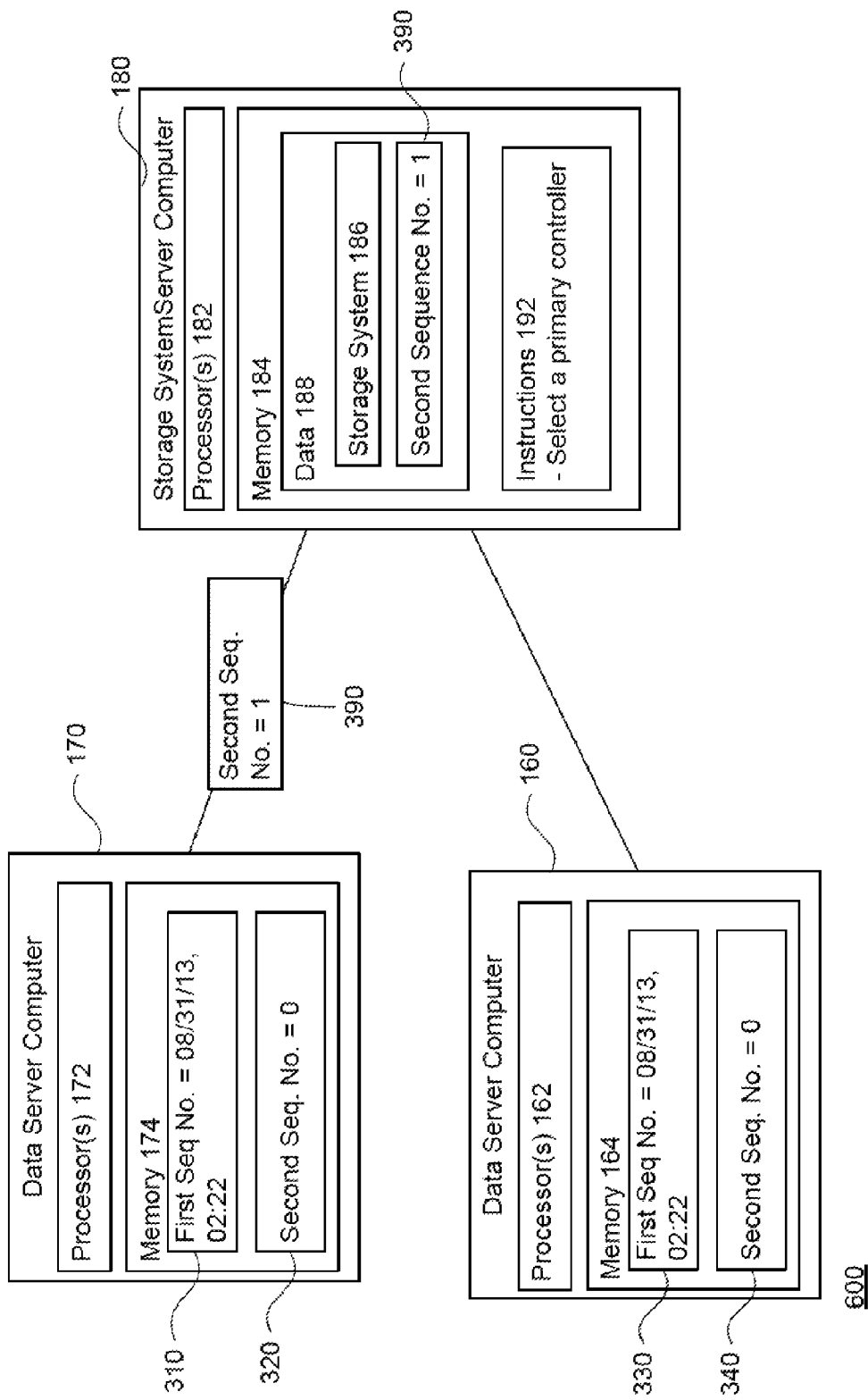
FIG. 6 is an example of sending a second sequence number in accordance with aspects of the disclosure.

FIG. 6 is an example 600 of storage system server 180 sending the increased second sequence number 390 to primary controller server 170. Optionally, the storage system server 180 may not send the second sequence number (now having a value of 1) to the any other data server that has not been selected as the primary controller server. For example, storage system server 180 may not send the increased second sequence number to data server 160. In the future, however, if data server 160 is selected as the primary controller server, then storage system server 180 may send the increased second sequence number to data server 160 and not to data server 170.

The primary controller server may receive the increased second sequence number from the storage system server. For example, primary controller server 170 may store the increased second sequence number 390 in its memory 174. As noted above, as no data server other than the primary controller server will receive the increased second sequence number 390, no other data server will store it. In this regard, data server 160 may not receive or store the increased second sequence number 390 because data server 160 has not been selected as the primary controller server. In future scenarios, however, the storage system server may select an alternate data server as the primary controller server. In this case, the alternate data server may receive and store the increased second sequence number 390.

Figure 7:
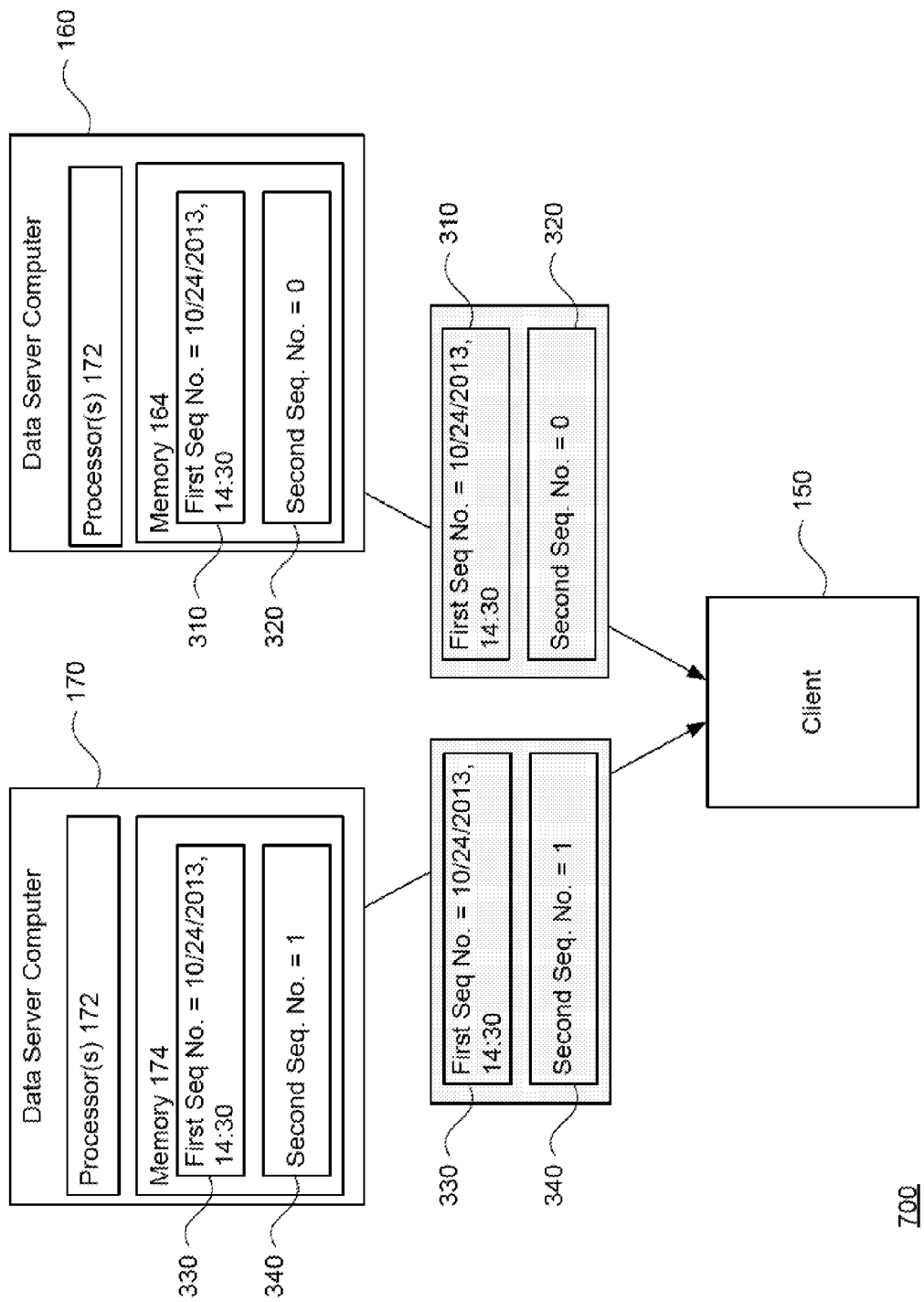
FIG. 7 is an example of sending sequence numbers in accordance with aspects of the disclosure.

FIG. 7 is an example 700 of data server 160 and the primary controller server 170 each sending the first and second sequence numbers from memories 164 and 174, respectively, to a client device, such as client device 150. These sequence numbers may be sent by way of network 120 as discussed above. Although only a single client device is depicted in FIG. 7, the data servers may send sequence numbers to any number of client devices of the system. In addition, a data server may send its sequence numbers to a client device even though that particular data server is not the primary controller server, as shown with respect to data server 160 in FIG. 7. As another example, all, some, or only one data server on a network may send sequence numbers to a client device.

Figure 8:
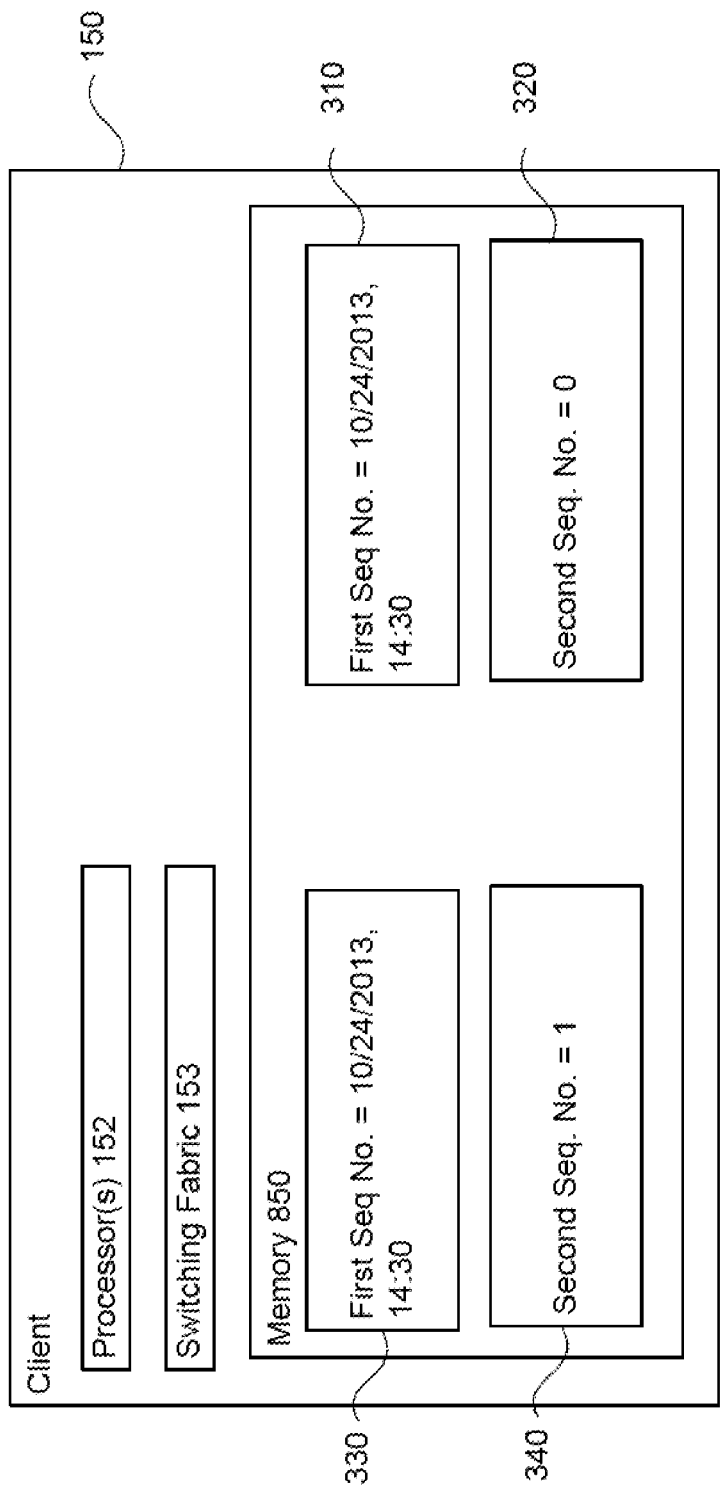
FIG. 8 is an example diagram of processing sequence numbers in accordance with aspects of the disclosure.

After the data servers send the sequence numbers, client devices receive and store the sequence numbers. By way of example, FIG. 8 illustrates an example 800 of client device 150 storing all sequence numbers received from data servers 160 and 170 in example 700.

The client devices may process the sequence numbers to identify the primary controller server from among the data servers that sent the sequence numbers. In the example FIG. 8, client device 150 processes the sequence numbers received from data servers 160 and 170 in order to identify which of the data servers is the primary controller server.

For instance, a client device may first select any data server that sent the highest first sequence number. If only a single data server is selected, the client device may identify this data server as the primary controller server. More than one server may be selected if multiple data servers have sent the same sequence number.

From the group of data servers selected, the client device may then identify the data server with the highest second sequence number as the primary controller server. As shown in FIG. 8, the first sequence numbers 310 and 330 are identical. Thus, client device 150 may then analyze the second sequence numbers 320 and 340. Here, the client device may determine that the second sequence number 340 is higher than the second sequence number 320.

In one example, the client device may store the following values on start-up according to the following:
master_id=" ";
last_cell_epoch=0;
last_gen_id=0;

The value master_id indicates which data server was last identified by the client device as the primary controller server. In this example, at the start-up of the client device, there is no primary controller server. The value last_cell_epoch is the first sequence number and last_gen_id is the second sequence number. As illustrated above, both sequence numbers are set to zero because the client device has not received any values yet.

After receiving sequence numbers from the data servers, the client device may use the following equation to identify the primary controller server by comparing the received sequence numbers to the start-up values:
If ((x_cell_epoch>last_cell_epoch)||
  ((x_cell_epoch==last_cell_epoch) &&
    (x_gen_id>last_gen_id)))
{master_id=x_id;
  last_cell_epoch=x_cell_epoch;
  last_gen_id=x_gen_id;
}

In this example, the client device first determines whether a received first sequence number (x_cell_epoch) is greater than or equal to the stored first sequence number (last_cell_epoch) on start-up. If the received first sequence number (x_cell_epoch) is not greater than or equal to the stored first sequence number (last_cell_epoch), then the data server corresponding to the value of master_id is identified as the primary controller computer. If the received first sequence number (x_cell_epoch) is greater than or equal to the stored first sequence number (last_cell_epoch), the client device analyzes whether a received second sequence number (x_gen_id) is greater than the stored second sequence number (last_gen_id) on start-up. If the received second sequence number (x_gen_id) is greater than the stored second sequence number (last_gen_id), then the server that sent the sequence numbers may be identified as the selected primary controller server.

In another example, if the client device receives sets of sequence numbers from multiple data servers, then the client device may analyze and compare the received sequence numbers, including the client device's stored sequence numbers on start-up.

Alternatively, the stored sequence numbers discussed above with regard to last_cell_epoch and last_gen_id may be sequence numbers of a prior selected primary controller server. For example, the client device may already be communicating with a selected primary controller server. Thus, the new sets of sequence numbers the client device receives may be from a new selected primary controller server. The client device may process the new sequence numbers similarly as described above.

In the event of a connection time-out between the client device and the selected primary controller server, the client device may re-evaluate itself as follows:
   master_id=" ";//We do not have a master.
   //last_cell_epoch and last_gen_id remain unchanged In this example, the client device may not have a selected primary controller server (master_id). However, the first sequence number (last-cell_epoch) and second sequence number (last_gen_id) may remain unchanged. In this regard, the client device may process any received sequence numbers again to identify a primary controller server.

Figure 9:
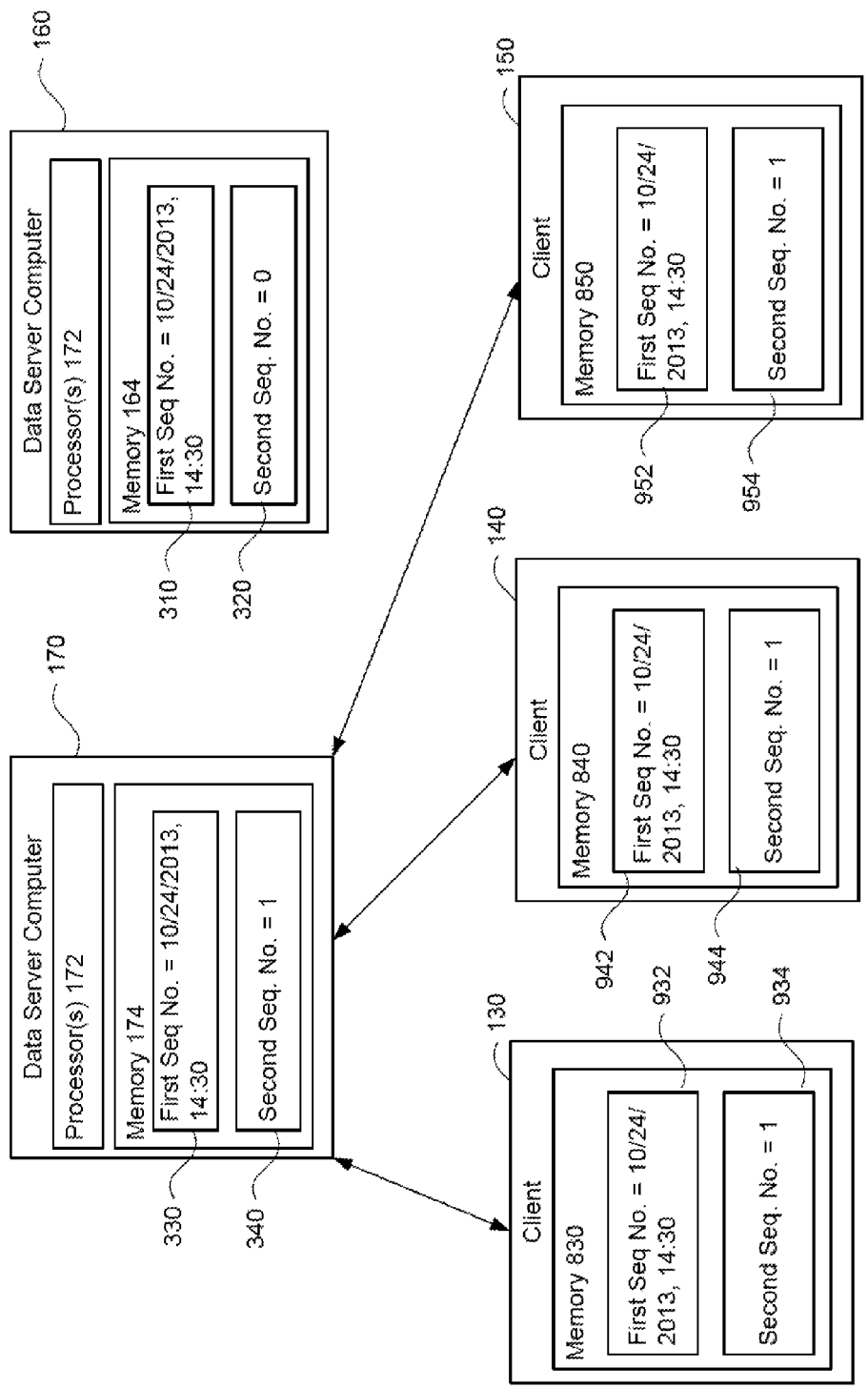
FIG. 9 is an example illustrating sending data to a primary controller in accordance with aspects of the disclosure.

Once the client device determines the identification of the primary controller server, the client device may communicate with the correct data server. For example, as shown in example 900 of FIG. 9, client devices 130, 140 and 150 may reliably communicate with the selected primary controller server 170. The communications may include sending data to and receiving data from the primary controller server 170. As an example, these client devices may not communicate with the other data server 160. In the future, however, if data server 160 becomes a selected primary controller server, then client devices 130, 140 and 150 may communicate with data server 160.

In addition, the client devices may continue receiving sets of sequence numbers from data servers after the client devices have identified the primary controller server. In this regard, the client devices may process, as described above, the received sequence numbers to determine whether any data server is a new selected primary controller server. If so, the client devices may terminate their respective connections with the old primary controller server, and establish a connection with the new selected primary controller server.

Figure 10:
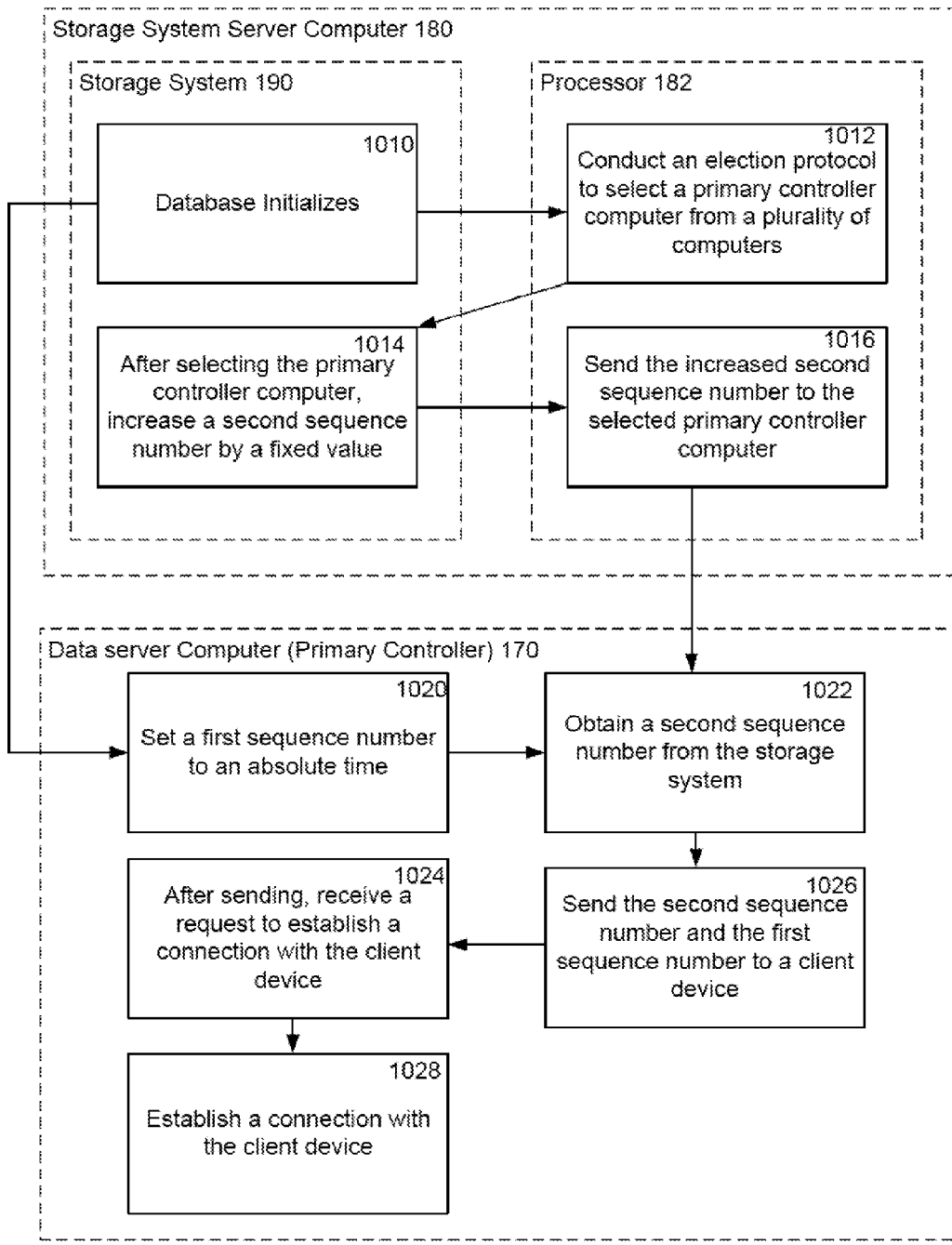
FIG. 10 is an example flow diagram in accordance with aspects of the disclosure.

FIG. 10 is an example flow diagram 1000 of certain features described above. The process illustrated in the flow diagram may be performed by one or more computing devices, such as storage system server 180 and the associated storage system 186, and selected primary controller server 170. In this example, the database initializes at block 1010. Upon initialization, the data server 170 sets a first sequence number to an absolute time at block 1020. The storage system server 180 conducts an election protocol to select a primary controller server from a plurality of computers at block 1012. After selecting the primary controller server, the second sequence number may be increased by a given value at block 1014. The storage system server 180 then sends the increased second sequence number to the selected primary controller server 170, as shown at block 1016. From here, the primary controller server 170 obtains a second sequence number from the storage system server 180 at block 1022. The primary controller server 170 then send the first sequence number and the second sequence number to a client device (not shown) at block 1026. After sending, the primary controller server 170 receives a request to establish a connection with the client device at block 1024. The primary controller server 170 then establishes a connection with the client device at block 1028.

Figure 11:
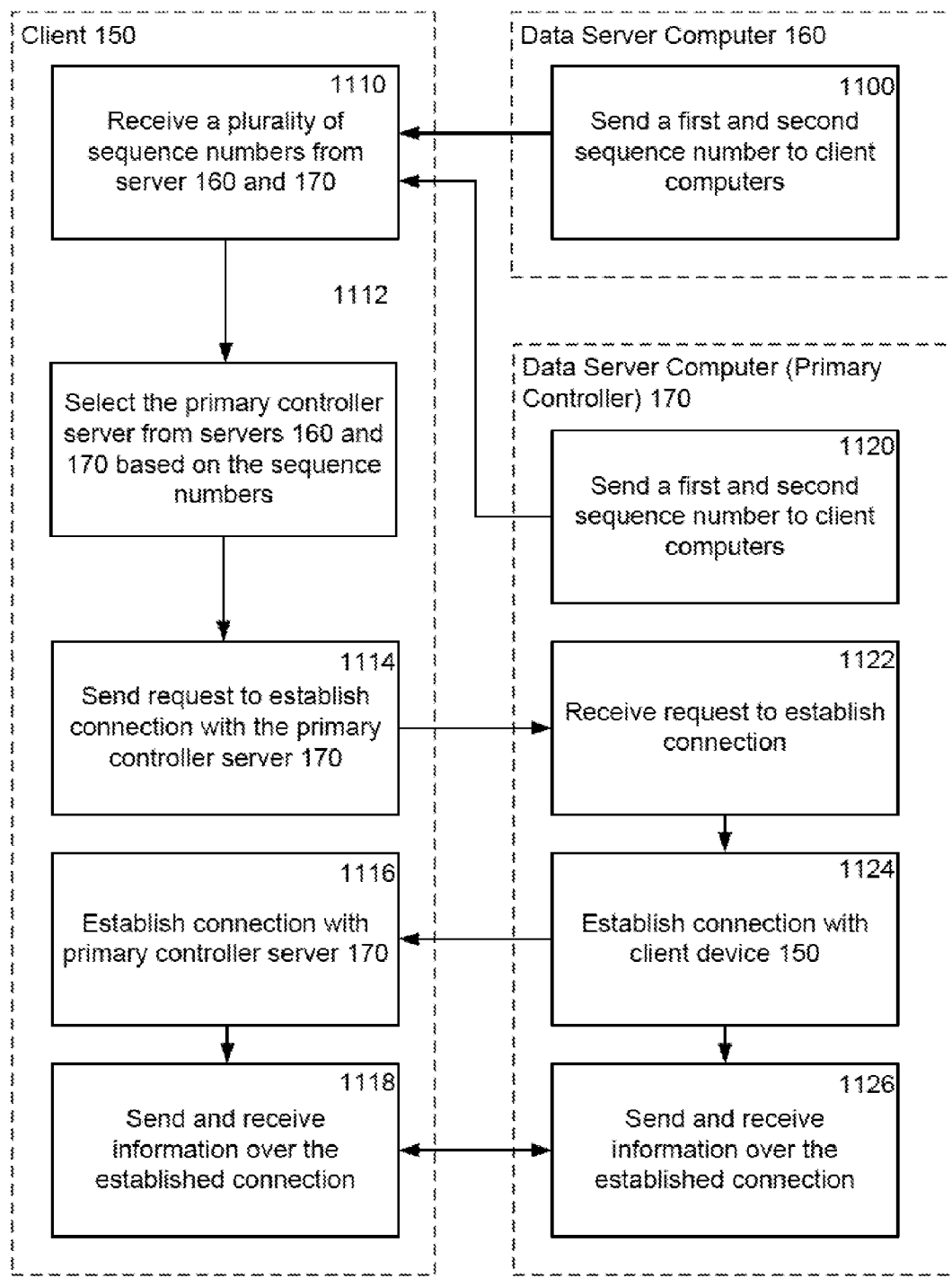
FIG. 11 is another example flow diagram in accordance with aspects of the disclosure.

FIG. 11 is another example of a flow diagram 1100 of features described above, which may be performed by one or more computing devices, such as client device 150, data server 160, and primary controller server 170. As shown, data server 160 and primary controller server 170 each send first and second sequence numbers to client device 150 at blocks 1100 and 1120, which are received at client device 150 at block 1110. The client device 150 then selects a primary controller server from data server 160 and primary controller server 170 based on the sequence numbers at block 1112. The client device 150 sends a request to establish a connection with the primary controller server 170 at block 1114. The primary controller server 170 receives the request to establish a connection at block 1122. At blocks 1124 and 1116 a connection is established between the primary controller server 170 and client device 150. The client device 150 and primary controller server 170 are now capable of sending and receiving information over the established connection at blocks 1118 and 1126

In another example, the first sequence number may be stored remotely from the storage system server. For instance, the first sequence number may be stored in a second storage system. The second storage system may be associated with a second storage system server configured similarly, for example, to storage system server 180. In this regard, the second storage system server may perform the processing for the second storage system.

The first sequence number stored in the second storage system may correspond to an absolute time when the storage system server is initialized. Alternatively, the remotely stored first sequence number may be a series of digits or values that can be increased monotonically.

As the first sequence number may update according to the absolute time when stored locally, the first sequence number may update according to the absolute time when stored remotely as well. For example, when the storage system server initializes, the first sequence number stored on the second storage system server may update according to the absolute time. Alternatively, when the remotely stored first sequence number is a series of digits or values, the first sequence number may update by a given value.

When the first sequence number is stored remotely on a second storage system server, the second storage system server may send the updated first sequence number to at least one of the data servers. For instance, if the first sequence number updates according to the absolute time, then the updated absolute time may be sent over a network to the data servers as a first sequence number. Alternatively, if the first sequence number updates according to a given value, then the updated value of the first sequence number may be sent over a network to the data servers. In addition, the second storage system server may send the first sequence number to one, some, or all data servers on the network.

Client devices may also reject certain sequence numbers that the client devices receive from data servers. In this regard, the client device need not consider such sequence numbers when identifying the selected primary controller server. For instance, the sequence numbers from the current selected primary controller server may be stored and compared with received sets of sequence numbers from other data servers. The client devices may then reject any set of sequence numbers that are lower than the stored sequence numbers from the selected primary controller server.

In some examples, until the client devices establish connections with the selected primary controller server, the client devices may communicate with an alternate server. For example, a client device may be connected to a data server which was at one time identified as the primary controller server, but is no longer the primary controller server because a new primary controller server has been selected using an election protocol. In this regard, the client device may continue sending and receiving data to and from the old primary controller server until a connection is established with the new primary controller server.

As the first sequence number may be updated and the second sequence number may be reset when the storage system server initializes, the same may occur when certain components of the storage system server initializes. For example, the first sequence number may update and the second sequence number may reset when a database associated with the storage system server initializes, the storage system server as a whole initializes, or the storage system associated with the storage system server initializes.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
  initializing a database associated with a computer storage system server;
  selecting, using one or more processors, a primary controller computer from a plurality of server computers, each of the plurality of server computers having a controller sequence number and a timing sequence number associated therewith, the controller sequence number indicative of which server computer from the plurality of server computers is to be used as the primary controller computer, and the timing sequence number indicative of which server computers from the plurality of server computers received notification of the database's initialization;
  when the primary controller computer is selected, increasing, using the one or more processors, the controller sequence number by a given value; and
  sending, using the one or more processors, the increased controller sequence number to the selected primary controller computer and not to other ones of the plurality of server computers.

2. The method of claim 1, wherein the selected primary controller computer is a first primary controller computer, and the method further comprises:
  selecting a new primary controller computer from the plurality of computers;
  increasing the controller sequence number by the given value; and
  sending the increased controller sequence number to the new primary controller computer and not to the first primary controller computer or other ones of the plurality of server computers.

3. The method of claim 1, wherein:
  upon initialization of the computer storage system server, setting the timing sequence number to correspond to a second given value after receiving notification that the database associated with the computer storage system server has initialized; and
  the selected primary controller computer sending the controller sequence number and the timing sequence number to a plurality of client devices.

4. The method of claim 3, wherein the second given value corresponds to one of either an absolute time or a number.

5. The method of claim 1, wherein:
  upon initialization of the computer storage system server, a second storage system server setting the timing sequence number to correspond to a second given value; and
  the second storage system server sending the timing sequence number to at least one of the plurality of computers.

6. A method comprising:
  receiving a timing sequence number and a controller sequence number from at least one of a plurality of server computers, the timing sequence number indicative of which server computers from the plurality of server computers received notification of initialization of a computer storage system server, and the controller sequence number indicative of which server computer from the plurality of server computers is to be used as a primary controller computer;
  determining, using one or more processors, which server computer is the primary controller computer by evaluating values of both the timing sequence number and the controller sequence number; and
  based on the determination of the primary controller computer, establishing, using the one or more processors, a connection between a client device and the primary controller computer.

7. The method of claim 6, wherein determining which server computer is the primary controller computer includes:
  identifying at least one server computer from the plurality of server computers with a highest value of the timing sequence number; and
  selecting the primary controller computer based on the server computer with the highest value of the controller sequence number from among the identified server computers.

8. The method of claim 6, further comprising:
  storing a highest tuple of the timing sequence number and the controller sequence number from among all tuples of the timing sequence number and the controller sequence number for each of a plurality of server computers; and
  rejecting any received sequence numbers that are a lower tuple than the stored highest tuple of the timing sequence number and the controller sequence number.

9. The method of claim 6, further comprising communicating with at least one alternative controller computer from the plurality of server computers until the connection with the primary controller computer is established.

10. A system comprising:
  a computer storage system server; and
  a plurality of server computers, the plurality of server computers including a primary controller computer, each of the plurality of server computers being operatively coupled to the computer storage system server;
  wherein the computer storage system server includes one or more processors configured to:
    initialize a database associated with the computer storage system server;
    select the primary controller computer from the plurality of server computers, each of the plurality of server computers having a controller sequence number and a timing sequence number associated therewith, the controller sequence number indicative of which server computer from the plurality of server computers is to be used as the primary controller computer, and the timing sequence number indicative of which server computers from the plurality of server computers received notification of the database's initialization;

when the primary controller computer is selected, increase the controller sequence number by a given value; and send the increased controller sequence number to the selected primary controller computer and not to other ones of the plurality of server computers.

11. The system of claim 10, wherein the selected primary controller computer is a first primary controller computer, and the one or more processors of the computer storage system server are further configured to:

select a new primary controller computer from the plurality of computers;

increase the controller sequence number by the given value; and send the increased controller sequence number to the new primary controller computer and not to the first primary controller computer or other ones of the plurality of server computers.

12. The system of claim 10, wherein:

the one or more processors of the plurality of server computers are further configured to set the timing sequence number to correspond to a second given value after receiving notification that the database associated with the computer storage system server has initialized;

only the primary controller computer from among the plurality of server computers receives the increased controller sequence number from the computer storage system server; and only the primary controller computer sends the increased controller sequence number to a plurality of client devices.

13. The system of claim 10, further comprising a second computer storage system server, wherein:

one or more processors of the second computer storage system server are configured to:

set the timing sequence number to correspond to a second given value when the second computer storage system server receives notification that the database associated with the computer storage system server has initialized; and send the timing sequence number to at least one of the plurality of server computers.

14. A client device comprising one or more processors configured to:

receive a timing sequence number and a controller sequence number from each of a plurality of server computers in a computer network, the timing sequence number indicative of which server computers from the plurality of server computers received notification of initialization of a computer storage system server, and the controller sequence number indicative of which server computer from the plurality of server computers is to be used as a primary controller computer;

determine which server computer of the plurality is the primary controller computer by evaluating values of both the timing sequence number and the controller sequence number; and based on the determination of the primary controller computer, establish a connection between the client device and the primary controller computer.

15. The client device of claim 14, wherein the one or more processors of the client device determine which server computer is the primary controller computer by:

identifying at least one server computer from the plurality of server computers with a highest timing sequence number; and selecting the primary controller computer based on the server computer with a highest controller sequence number from among the identified server computers.

16. The client device of claim 14, wherein the one or more processors of the client device are further configured to:

store a highest tuple of the timing sequence number and the controller sequence number from among all tuples of the timing sequence number and the controller sequence number for each of a plurality of server computers; and reject any received sequence numbers that are a lower tuple than the stored highest tuple of the timing sequence number and the controller sequence number.

17. The client device of claim 14, wherein the one or more processors of the client device are further configured to communicate with at least one alternative controller computer from the plurality of server computers until the connection with the primary controller computer is established.

18. A non-transitory computer-readable storage medium on which computer readable instructions of a program are stored, the instructions, when executed by one or more processors, cause the one or more processors to perform a method comprising:

receiving a timing sequence number and a controller sequence number from each of a plurality of server computers, the timing sequence number indicative of which server computers from the plurality of server computers received notification of initialization of a computer storage system server, and the controller sequence number indicative of which server computer from the plurality of server computers is to be used as a primary controller computer;

determining, using one or more processors, which server computer is the primary controller computer by evaluating values of both the timing sequence number and the controller sequence number; and based on the determination of the primary controller computer, establishing, using the one or more processors, a connection between a client device and the primary controller computer.

19. The storage medium of claim 18, wherein determining which server computer is the primary controller computer includes:

identifying at least one server computer from the plurality of server computers with a highest value of the timing sequence number; and selecting the primary controller computer based on the server computer with the highest value of the controller sequence number from among the identified server computers.

* * * * *